United States Patent [19]
Nimpoeno

[11] Patent Number: 5,590,827
[45] Date of Patent: Jan. 7, 1997

[54] COMPACT DISC ORGANIZER ON SUN VISOR

[75] Inventor: Roy Nimpoeno, Monterey Park, Calif.

[73] Assignee: Scosche Industries, Inc., Moorpark, Calif.

[21] Appl. No.: 398,154

[22] Filed: Mar. 3, 1995

[51] Int. Cl.$^6$ ................................ B60R 7/00; B60R 7/05
[52] U.S. Cl. .................... 224/312; 224/929; D12/417; 206/308.1
[58] Field of Search .................................. 224/312, 929; D12/417; D3/218; D6/629; 206/308.1, 312, 313, 39; 150/147, 148, 149

[56] References Cited

U.S. PATENT DOCUMENTS

| | | |
|---|---|---|
| D. 189,713 | 2/1961 | Brandt . |
| D. 208,252 | 8/1967 | Standard . |
| D. 310,301 | 9/1990 | Burrow ................................ 224/312 |
| D. 343,514 | 1/1994 | Underwood, Jr. . |
| D. 362,159 | 9/1995 | Singh ................................ D12/417 |
| 2,181,324 | 11/1939 | Glover . |
| 2,436,096 | 10/1949 | Axford et al. . |
| 2,468,817 | 5/1949 | Duchin ................................ 206/39 |
| 2,655,299 | 10/1953 | Pfeifer et al. . |
| 2,726,757 | 12/1955 | Kellstrom . |
| 3,858,790 | 1/1975 | Humphrey ............................ 150/147 |
| 4,273,277 | 6/1981 | Stone . |
| 4,781,379 | 11/1988 | Parks ................................ 150/147 |
| 4,781,409 | 11/1988 | Harbison . |
| 4,844,311 | 7/1989 | Kalen . |
| 4,907,634 | 3/1990 | Yoo ................................ 150/147 |
| 4,921,027 | 5/1990 | Scheunemann ........................ 206/39 |
| 5,147,036 | 9/1992 | Jacobs ................................ 206/313 |
| 5,330,085 | 7/1994 | Horensky et al. . |

FOREIGN PATENT DOCUMENTS

| | | |
|---|---|---|
| 195588 | 6/1957 | Austria ................................ 224/312 |
| 62-180566 | 11/1987 | Japan . |
| 1148913 | 10/1989 | Japan . |
| 329494 | 3/1991 | Japan . |
| 4136915 | 12/1992 | Japan . |
| 568746 | 9/1993 | Japan . |
| 212958 | 4/1941 | Switzerland ........................ 150/147 |
| 2025210 | 1/1988 | United Kingdom . |

*Primary Examiner*—Henry J. Recla
*Assistant Examiner*—Gregory M. Vidovich
*Attorney, Agent, or Firm*—William W. Haefliger

[57] ABSTRACT

A multiple disc recording organizing holder apparatus comprising a substantially flat carrier panel which is elongated in a longitudinal direction to be attached to and carried by a vehicle sun visor, which is also longitudinally elongated, and flatly adjacent one side of the visor; there being a series of storage pockets on the panel having entrances exposed at at least one side of the panel; the pockets having entrance edges which are spaced apart longitudinally, and which define angles $\alpha$ relative to the longitudinal direction, where $65° < \alpha < 85°$.

2 Claims, 3 Drawing Sheets

5,590,827

COMPACT DISC ORGANIZER ON SUN VISOR

BACKGROUND OF THE INVENTION

This invention relates generally to storage of recording discs in positions for ready access; and more particularly, to a novel carrier panel attachable to a vehicle sun visor, and wherein the carrier panel provides a series of storage pockets for recording discs, such as compact discs. The latter are typically of a size conforming generally to the transverse dimensions of sun visors.

There is a need for means to store compact discs in vehicles, to enable their ready access. Such discs are ordinarily stored in their plastic containers, which are quite rigid and require two-handed manipulation to open the opposite sides of such container. This presents a safety problem to the operator of a vehicle in motion, since the operator should not release grasp of a steering wheel in order to open a CD container to gain access to the CD.

Also, there is need for a compact disc storage device which will enable ready, one-handed access to any of a series of such discs stored in a way that also enables their ready presentation as a group for selection in one position; and their out-of-the-way storage, as a group, in another position.

SUMMARY OF THE INVENTION

It is a major object of the invention to provide a device meeting the above need or needs. Basically, the device of the invention is a disc recording organizing holder apparatus, and comprising:

a) a substantially flat carrier panel which is elongated in a longitudinal direction to be attached to and carried by a vehicle sun visor, and flatly adjacent one side of the visor, b) there being a series of storage pockets on the carrier panel having entrances exposed at at least one side of the panel, c) the pockets having entrance edges which are spaced apart longitudinally, and which define angles $\alpha$ relative to the longitudinal direction, where:

$$65° < \alpha < 85°$$

Typically, the visor is in the form of a flat panel having an upper longitudinal edge and a lower longitudinal edge, the lower edge adapted to be swung downward, to expose one side of the visor, which is normally concealed, the carrier panel extending adjacent that one side of the visor, the pocket entrances then exposed to extend in a generally horizontal row and also toward the visor upper edge.

Another object is to provide apparatus, as referred to, wherein the pocket entrance edges extend in substantially parallel relation. The pockets are arranged to hold recording discs to have first portions frictionally retained in the pockets and second portions projecting out of the pockets, the second portions subtending angles $\beta$ where:

$$90° < \beta < 120°$$

Such discs typically comprise compact discs.

Yet another object is to provide a carrier panel, as described, wherein it has felt surfaces frictionally engaging the recording discs retained in the pockets. The side of the panel at which the discs are presented for selection desirably consists substantially entirely of felt. The CD-receiving pockets may be located in rows at opposite sides of the carrier panel, so that reversal of the carrier panel on the visor enables selection of another series of discs, doubling the capacity of the device.

An additional object includes the provision of means to attach the carrier panel to one side of the visor. Such means typically includes flaps hingedly connected to the carrier panel to fold over the visor at the opposite side thereof; and such attachment means may include interengageable VELCRO elements on the flaps. Alternatively, the carrier panel may be attached to the visor, as via elastic strap means. The carrier panel may be provided with additional retention means, as for example for a mirror, pencils, etc.

These and other objects and advantages of the invention, as well as the details of an illustrative embodiment, will be more fully understood from the following specification and drawings, in which:

DRAWING DESCRIPTION

DETAILED DESCRIPTION

In FIGS. 1-5, the apparatus 10 is constructed to provide a multiple recording disc organizing holder. See, for example, the multiple compact discs 11–16 in FIGS. 1, 3 and 5, received in pockets to be described.

Figure 1:
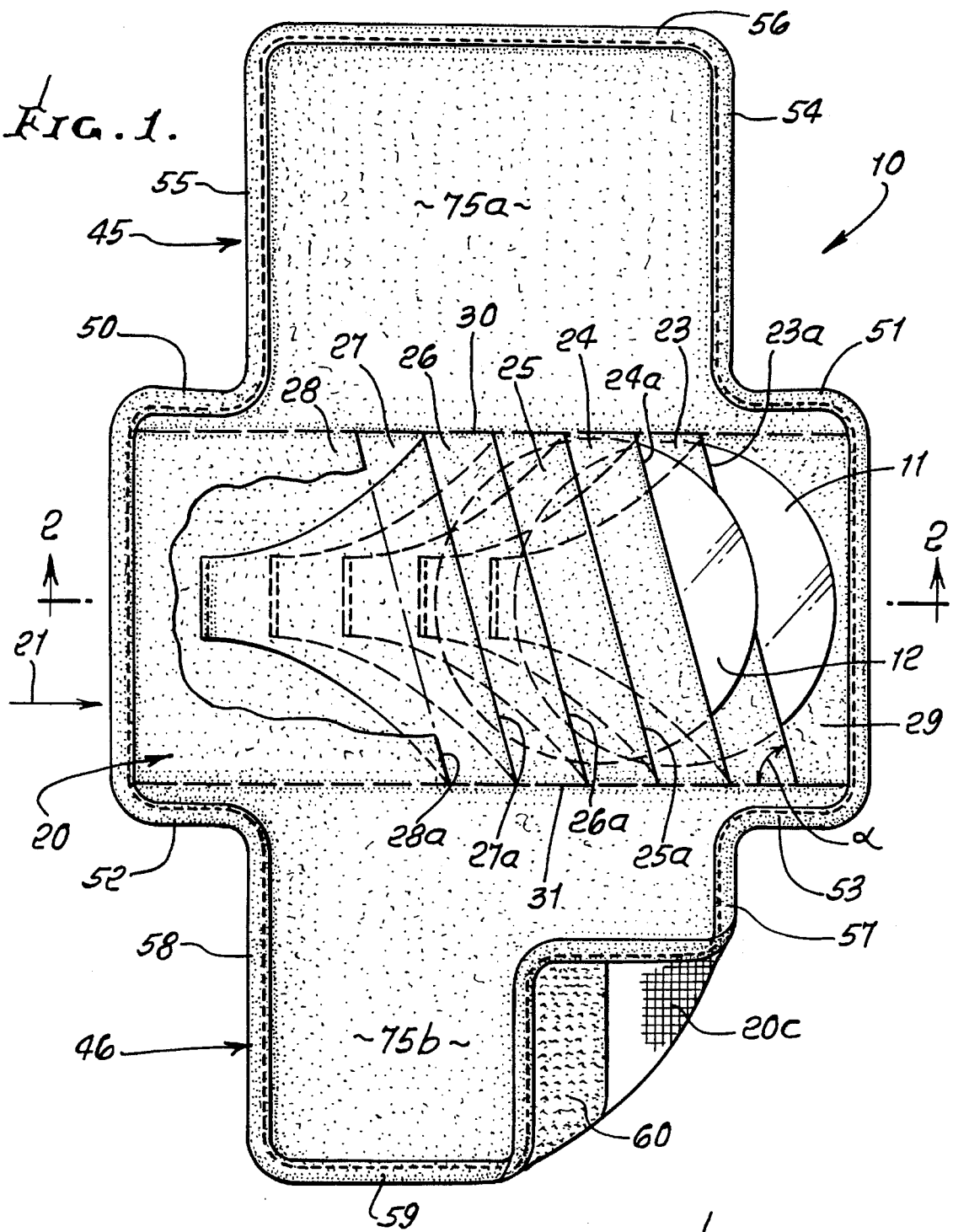
FIG. 1 is a plan view of a device incorporating the invention.

The apparatus 10 includes a carrier panel 20, which is substantially flat, as seen in FIG. 1, and elongated in a longitudinal direction indicated by arrow 21. The panel 20 is sized to be attached to and carried by a vehicle sun visor indicated at 22 in FIGS. 3 and 4. The visor is also typically longitudinally elongated and has substantially flat, opposite sides 22a and 22b.

Figure 4:
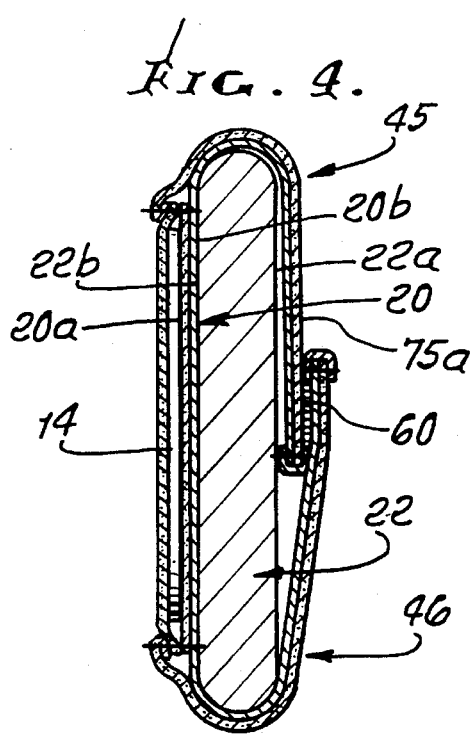
FIG. 4 is a section taken on lines 4—4 of FIG. 3.

In FIG. 4, the apparatus is shown attached to the visor, whereby panel 20 extends flatly adjacent side 22a of the visor. Note that the panel 20 has a front side 20a and a rear side 20b.

Figure 2:
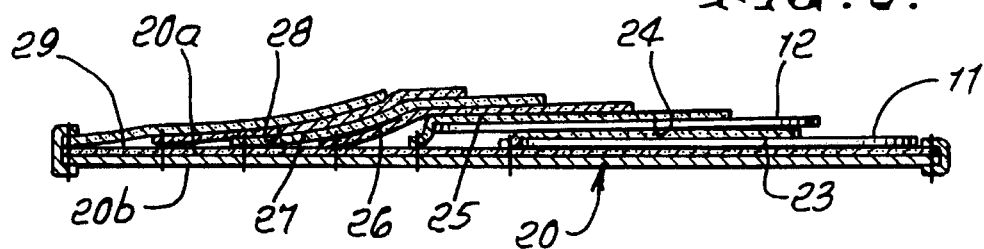
FIG. 2 is a section taken on lines 2—2 of FIG. 1.

A series of pockets, as referred to above, is incorporated on the panel 20 to have entrances exposed at at least one side of the visor. The pockets, as shown, are formed beneath outer flaps 23–28, which extend in a row, and particularly overlap or underlap one another, as for example is indicated in FIG. 2. Pocket flap edges may be suitably attached to an under layer 29, as along longitudinal edge lines indicated at 30 and 31 in FIG. 1. The pocket widths are slightly larger than the diameters of the CD's 11–16, and the pocket depths are substantially less than the diameter of the CD's, whereby the CD's are frictionally retained in the pockets, engaging the flap inner sides; however, portions of the CD's project freely from the pockets, as shown, for ready manual, one-handed grasping by the vehicle operator, or passenger, for example.

The pockets have entrance edges, defined for example by the flaps at 23a–28a, which are spaced longitudinally, and define angles α relative to the longitudinal direction, where α lies between 65° and 85°, i.e., 65°<α<85°

Figure 3:
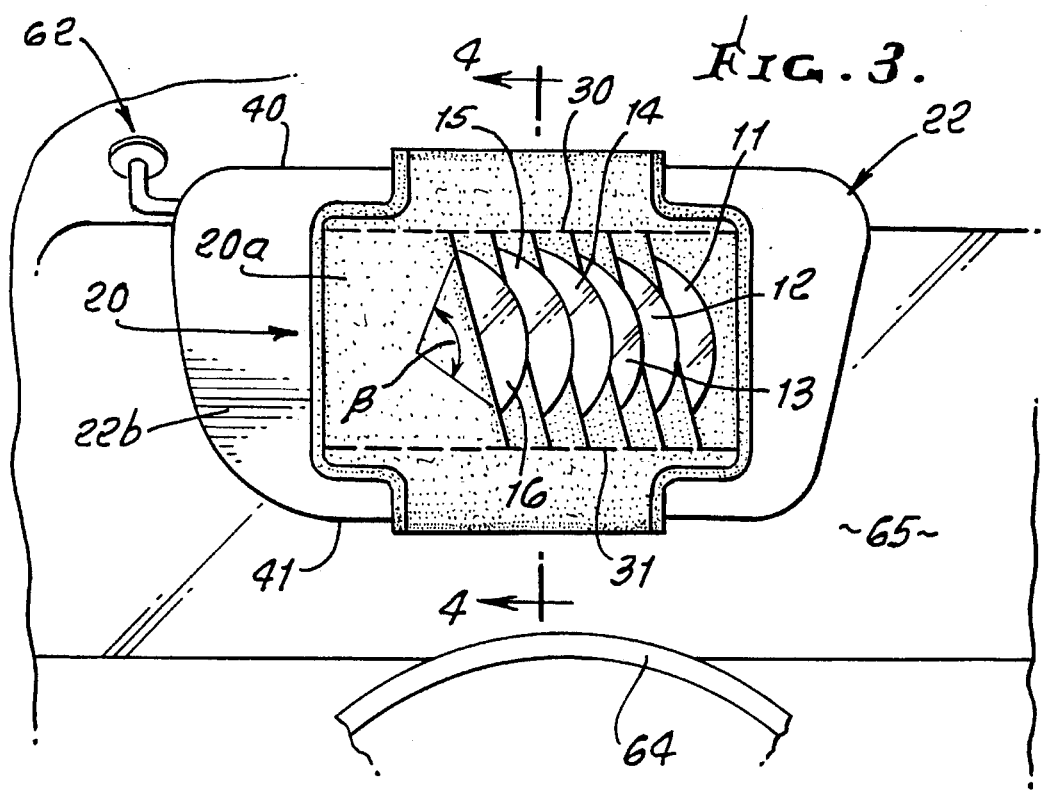
FIG. 3 is a frontal view of the FIG. 1 device attached to a sun visor deployed downward to present stored compact discs, for selection.
Figure 5:
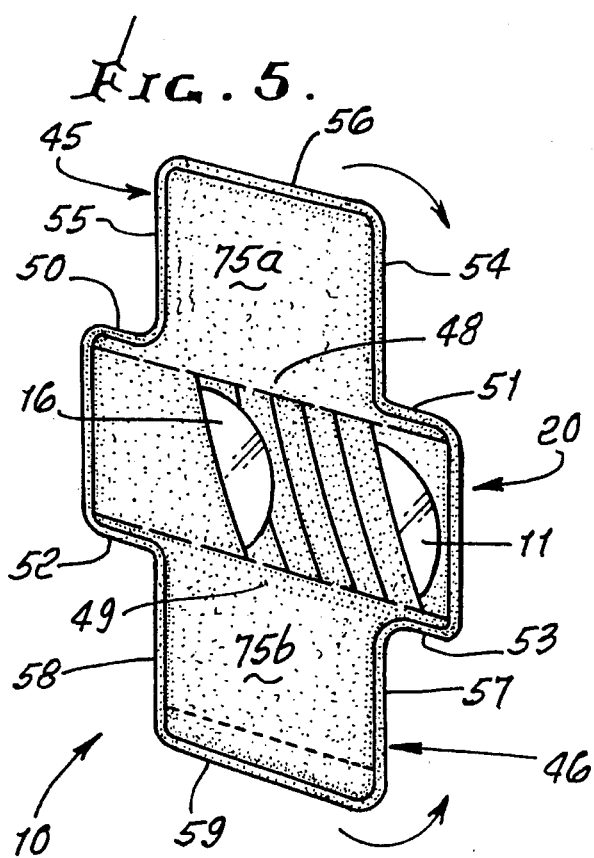
FIG. 5 is a perspective view of the device in vertical, opened position.

As shown in FIG. 3, the visor flat panel has an upper longitudinal edge 40 and a lower longitudinal edge 41. Edge 41 is adapted to be swung down to FIG. 3 position, to expose or present the visor side 22b normally concealed upwardly. The pocket angled entrances, adjacent edges 23a–28a, are then exposed to extend in a longitudinal row; and also to extend upwardly and leftwardly as shown in FIG. 3, facilitating ready selective grasping of the CD's for removal from the panel 20, and for reinsertion into the pockets, when desired.

Note that the pocket edges extend upwardly and leftwardly in substantially parallel relation. The CD's have first portions frictionally retained in the pockets and second portions projecting out of the pockets, the second portions subtending angles β from their centers, where: 90°<β<120°. Also, the disc second portions overlap the entrance edges of the next in sequence pockets. The carrier panel pockets may consist of felt to provide felt surfaces protectively and frictionally engaging the recording discs retained in the pockets. Panel backer layer 20c may consist of relatively stiff, yet somewhat flexible, fabric material, such as NYLON.

Means is provided to readily and removably attach the carrier panel 20 to side 22b of the visor. As shown, such means may include flexible flaps 45 and 46 hingedly connected to or integral with panel 20, so as to fold over the visor edges and connect together at the rear side 22a of the visor. See FIG. 4. Such hinging is defined, with unusual advantage, by flap narrowing in the longitudinal direction, so that the connection loci (of 45 and 46 to 20) at 48 and 49, extend longitudinally. See for example longitudinal seam binding at 50 and 51 associated with flap 45 locus 48 of connection with 20, and longitudinal seam binding at 52 and 53 associated with flap 46 locus 49 of connection with 20. The seam binding may extend as a substantially continuous strip at 54–56 from 50 and 51, and at 57–59 from 52 and 53. Surface layers 75a and 75b on the flaps may consist of felt. VELCRO layer 60 on the underside of flap 46 may then engage felt layer 75a, as shown in FIG. 4, to adjustably attach the panel 20 to the visor. Narrowing of the flaps 45 and 46, longitudinally, also avoids interference of the flaps with the visor hinge means 62 at the left end of the visor, as shown, and particularly for shorter visor applications. A corner is formed by one flap and the carrier panel, to face 62, as shown.

FIG. 3 also shows the vehicle steering wheel 64 and front windshield 65.

Figure 6:
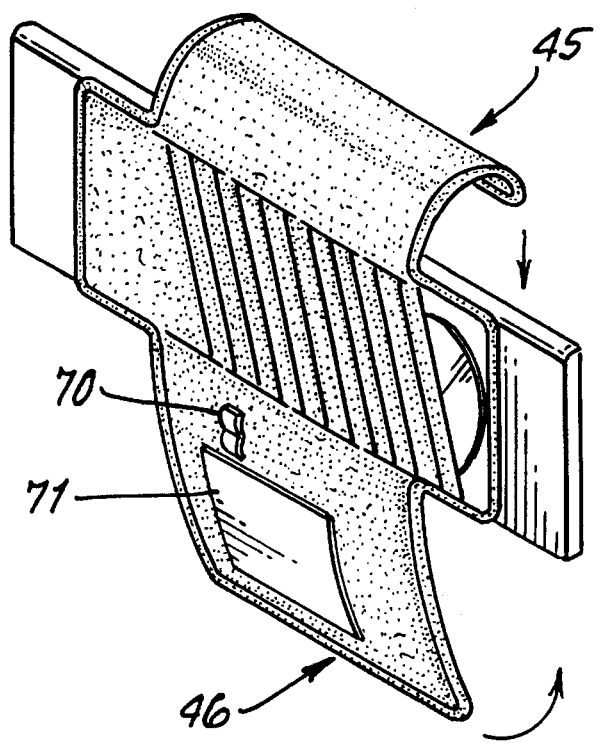
FIG. 6 is a perspective view like FIG. 5 showing a modified device.

FIG. 6 shows auxiliary holders 70 and 71 on flap 46, such as a pencil holder and sunglass holder or garage door opener.

Figure 7:
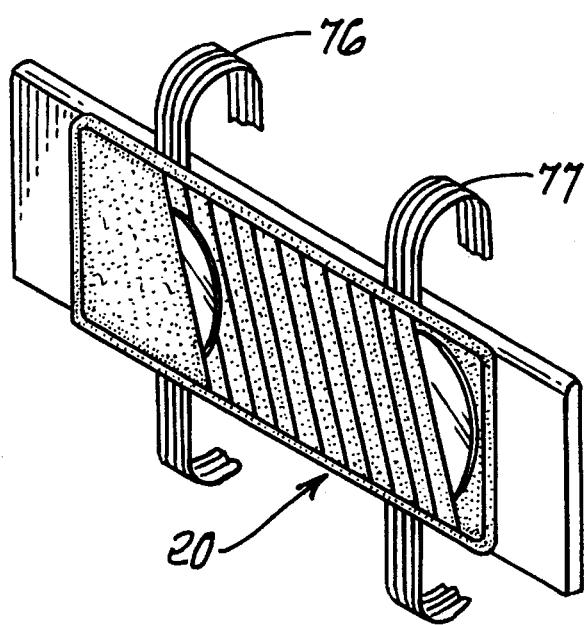
FIG. 7 is a view like FIG. 6 showing the device having retention straps.

FIG. 7 shows attachment means for panel 20 in the form of elastic straps or loops 76 and 77 that fit over the visor. There are twelve CD pockets shown.

Figure 8:
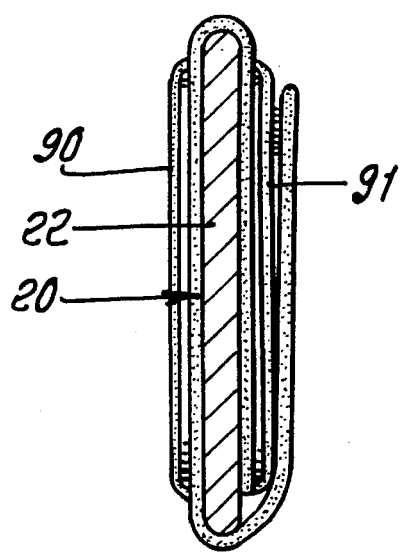
FIG. 8 is a view like FIG. 4 showing a modified device having CD pockets at its opposite sides.

FIG. 8 shows a modification in which pockets for CD's are also formed at the opposite side of the carrier layer 20. See the rows of pockets 90 and 91 on a U-shaped panel 20, and carried at opposite sides of the visor 22 for selective exposure.

I claim:

1. A multiple disk recording organizing holder apparatus comprising:

a) a substantially flat carder panel which is elongated in a longitudinal direction adapted to be attached to and carried by a vehicle sun visor, which is also longitudinally elongated, and flatly adjacent one side of the visor, said carrier panel having opposite sides and longitudinal sides, b) there being a first series of disc recording storage pockets on said panel having entrances exposed at at least one side of said panel, c) said pockets having entrance edges which are spaced apart longitudinally, and which define angles α relative to said longitudinal direction, where:

65°<α<85°, d) means to connect said carrier panel to the one side of the visor, said means including two flaps each having a hinge connection to respective said longitudinal sides of said carrier panel adapted to fold over the visor at the opposite side thereof, said two flaps having approximately equal overall length which is substantially less than the overall longitudinal length of said carrier panel, e) each said flap being everywhere longitudinally spaced from said opposite ends of said carrier panel, each said overall longitudinal length of each said flap being greater than half the overall length of said carrier panel, whereby said carrier panel and said flaps in an unfolded condition have a cruciform shape, and f) one of said two flaps includes a second series of disk recording storage pockets wherein the other of said two flaps overlaps said second series of pockets when folded over the visor.

2. The apparatus of claim 1 wherein said means to connect said carrier panel to the visor further comprises cooperating adhesive means on each said flap.

* * * * *